(12) United States Patent
Cole (10) Patent No.: US 12,381,588 B2
(45) Date of Patent: Aug. 5, 2025

(54) NOISE MINIMIZATION TO COMMUNICATE WITH A BEACON

(71) Applicant: The Charles Machine Works, Inc., Perry, OK (US)

(72) Inventor: Scott B. Cole, Edmond, OK (US)

(73) Assignee: The Charles Machine Works, Inc., Perry, OK (US)

( * ) Notice: Subject to any disclaimer, the term of this patent is extended or adjusted under 35 U.S.C. 154(b) by 127 days.

(21) Appl. No.: 18/353,483

(22) Filed: Jul. 17, 2023

(65) Prior Publication Data

US 2023/0378986 A1 Nov. 23, 2023

Related U.S. Application Data (63) Continuation-in-part of application No. 17/074,851, filed on Oct. 20, 2020, now Pat. No. 11,711,104.
(Continued)

(51) Int. Cl.
| | |
|---|---|
| *H04B 1/10* | (2006.01) |
| *H01Q 1/04* | (2006.01) |
| *H01Q 7/00* | (2006.01) |
| *H01Q 21/24* | (2006.01) |
| *H01Q 21/29* | (2006.01) |

(52) U.S. Cl.
CPC ............ *H04B 1/1009* (2013.01); *H01Q 1/04* (2013.01); *H01Q 21/24* (2013.01); *H01Q 21/29* (2013.01); *H01Q 7/00* (2013.01)

(58) Field of Classification Search
CPC ........ H04B 1/123; H04B 1/14; H04B 1/1638; H04B 17/21; H04B 17/27; H04B 17/345; H04B 17/102; H04B 1/1009; E21B 47/12; G01V 3/12; G01V 3/083; G01V 3/28; G01S 13/885; G01S 13/88; G01S 13/0209;
(Continued)

(56) References Cited

U.S. PATENT DOCUMENTS

| | | |
|---|---|---|
| 4,542,344 A | 9/1985 | Darilek et al. |
| 4,742,356 A | 5/1988 | Kuipers |

(Continued)

FOREIGN PATENT DOCUMENTS

| | | |
|---|---|---|
| DE | 19533105 A1 | 10/1996 |
| EP | 1526606 A1 | 4/2005 |

(Continued)

*Primary Examiner* — Raul J Rios Russo
(74) *Attorney, Agent, or Firm* — Tomlinson McKinstry, P.C.

(57) ABSTRACT

A method for detecting a beacon signal using an above-ground tracker. The tracker comprises an antenna assembly comprising a plurality of antennas. Each antenna is oriented in a different direction. During operation, if the beacon signal is interrupted due to a local noise source, transmission of the beacon signal is stopped. The tracker then detects radiation from the local noise source and the processor determines a direction from which peak ambient noise arrives at the tracker. The beacon signal is then resumed. A processor included in the tracker excludes any signals generated by the antenna assembly that are representative of radiation that arrived at the tracker from the same direction the peak ambient noise arrived at the tracker. The tracker then detects the beacon signal using the non-excluded signals.

20 Claims, 11 Drawing Sheets

Related U.S. Application Data (60) Provisional application No. 62/923,784, filed on Oct. 21, 2019.

(58) Field of Classification Search
CPC .......... H01Q 21/29; H01Q 1/04; H01Q 21/24; H01Q 7/00
USPC .................................. 324/323, 327, 332, 376
See application file for complete search history.

(56) References Cited

U.S. PATENT DOCUMENTS

| | | |
|---|---|---|
| 5,397,986 A | 3/1995 | Conway et al. |
| 5,640,092 A | 6/1997 | Motazed et al. |
| 5,699,048 A | 12/1997 | Galloway |
| 5,904,210 A | 5/1999 | Stump et al. |
| 6,005,532 A | 12/1999 | Ng |
| 6,035,951 A | 3/2000 | Mercer et al. |
| 6,496,008 B1 | 12/2002 | Brune et al. |
| 6,563,474 B2 | 5/2003 | Nantz et al. |
| 6,640,907 B2 | 11/2003 | Mercer et al. |
| 6,737,867 B2 | 5/2004 | Brune et al. |
| 6,865,455 B1 | 3/2005 | Wiegert |
| 6,882,154 B2 | 4/2005 | Mercer et al. |
| 6,924,767 B2 | 8/2005 | Kitahara et al. |
| 7,009,399 B2 | 3/2006 | Olsson et al. |
| 7,013,990 B1 | 3/2006 | Nickel et al. |
| 7,042,411 B2 | 5/2006 | Yagi et al. |
| 7,786,731 B2 | 8/2010 | Cole et al. |
| 7,952,357 B2 | 5/2011 | Cole |
| 8,264,226 B1 | 9/2012 | Olsson et al. |
| 8,497,684 B2 | 7/2013 | Cole et al. |
| 8,729,901 B2 | 5/2014 | Lam et al. |
| 8,928,323 B2 | 1/2015 | Cole et al. |
| 9,329,297 B2 | 5/2016 | Cole et al. |
| 9,423,503 B2 | 8/2016 | Cole et al. |
| 2002/0070902 A1* | 6/2002 | Johnson ............... H01Q 19/005 343/702 |
| 2002/0105331 A1 | 8/2002 | Brune et al. |
| 2004/0070399 A1 | 4/2004 | Olsson et al. |
| 2004/0095280 A1* | 5/2004 | Poilasne ................. H01Q 9/16 343/702 |
| 2004/0125020 A1* | 7/2004 | Hendler ................. H01Q 21/30 343/846 |
| 2005/0023036 A1 | 2/2005 | Cole et al. |
| 2005/0077085 A1 | 4/2005 | Zeller et al. |
| 2006/0220966 A1* | 10/2006 | Sarychev ................ H01Q 9/42 343/702 |
| 2006/0254820 A1 | 11/2006 | Cole et al. |
| 2008/0036652 A1 | 4/2008 | Shore et al. |
| 2008/0096489 A1 | 4/2008 | He et al. |
| 2011/0001633 A1 | 1/2011 | Lam et al. |
| 2015/0036731 A1 | 2/2015 | Dark |
| 2020/0294568 A1 | 9/2020 | Wang |
| 2021/0111486 A1* | 4/2021 | Tamrakar ............. H01Q 1/2266 |
| 2022/0077586 A1* | 3/2022 | Jeong .................... H01Q 1/526 |
| 2022/0109462 A1 | 4/2022 | Fleischer |

FOREIGN PATENT DOCUMENTS

| | | |
|---|---|---|
| JP | 2003249816 A1 | 9/2003 |
| WO | 9530913 A | 11/1995 |
| WO | 0010456 A | 3/2000 |

\* cited by examiner

NOISE MINIMIZATION TO COMMUNICATE WITH A BEACON

SUMMARY

The present disclosure is directed to a method of using an underground beacon that transmits a beacon signal. The method comprises the steps of actuating an above-ground tracker that is adapted to receive the beacon signal, and if the beacon signal is active, discontinuing transmission of the beacon signal. The method also comprises the steps of determining a direction from which peak ambient noise arrives at the tracker, and thereafter, positioning the above-ground tracker such that at least one antenna of the plurality of antennas is oriented on an axis that does not extend perpendicular to the direction. The method further comprises the steps of starting or resuming transmission of the beacon signal and detecting the beacon signal using the at least one antenna.

The present disclosure is directed to a method of using an underground beacon that transmits a beacon signal. The method comprises the steps of actuating an above-ground tracker that is adapted to receive the beacon signal, and if the beacon signal is active, discontinuing transmission of the beacon signal. The method also comprises the steps of determining a direction from which peak ambient noise arrives at the tracker, and thereafter, positioning the above-ground tracker such that at least one antenna of the plurality of antennas is oriented on an axis that extends parallel to the direction. The method further comprises the steps of starting or resuming transmission of the beacon signal and detecting the beacon signal using the at least one antenna.

The present disclosure is also directed an above-ground tracker The above-ground tracker comprises a plurality of antennas and a processor. Each antenna is oriented in a different direction and is configured to receive electromagnetic radiation and generate a set of signals indicative of such radiation. The processor is configured to determine a direction from which peak ambient noise arrives at the above-ground tracker, determine an orientation at which at least one antenna of the plurality of antennas should be positioned so that the at least one antenna is situated on an axis that does not extend perpendicular to the direction at which peak ambient noise is received by the above-ground tracker, and direct an operator to position the above-ground tracker in the determined orientation.

DETAILED DESCRIPTION

Figure 1:
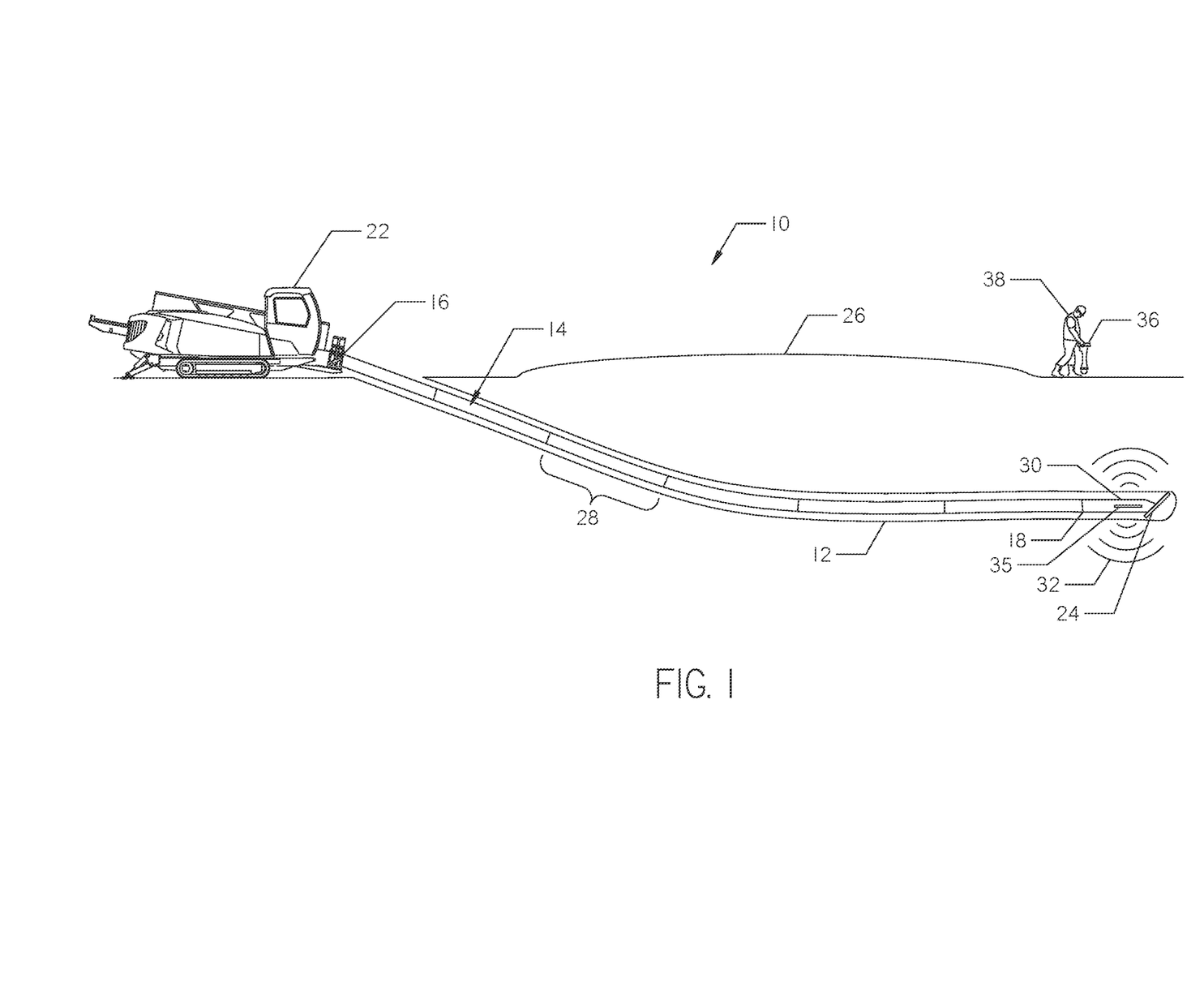
FIG. 1 is a diagrammatic illustration of a horizontal directional drilling system used to drill a borehole.

With reference to FIG. 1, a horizontal directional drilling system 10 is shown. The system 10 is used to create a borehole 12 under an above-ground obstacle, such as a roadway. The system 10 uses a drill string 14 having a first end 16 and a second end 18. The drill string 14 is attached to a drill rig 22 at its first end 16 and a drill bit 24 at its second end 18. The drill rig 22 is supported on a ground surface 26 and is operated by a rig operator. The drill string 14 comprises a plurality of hollow pipe sections 28 arranged in an end-to-end relationship. The drill string 14 functions to transmit thrust and rotation force from the drill rig 22 to the drill bit 24.

Continuing with FIG. 1, a downhole tool 30 is attached to the second end 18 of the drill string 14. The downhole tool 30 carries the drill bit 24 and houses a beacon 32, shown in FIG. 5. The beacon 32 is configured to emit a beacon signal 34 from the downhole tool 30 at a selected frequency. One or more beacon windows 35 may be formed in the downhole tool 30 for the beacon signal 34 to pass through. The beacon signal 34 is preferably a magnetic dipole field.

An above-ground tracker 36, operated by a tracker operator 38, is used to detect and analyze the beacon signal 34 in order to determine the downhole position of the beacon 32. The beacon signal 34 includes information about the beacon 32 as well as the downhole conditions, such as the downhole temperature and fluid pressure. In operation, the tracker operator 38 walks along the planned borepath tracking the beacon signal 34 with the tracker 36.

Figure 2:
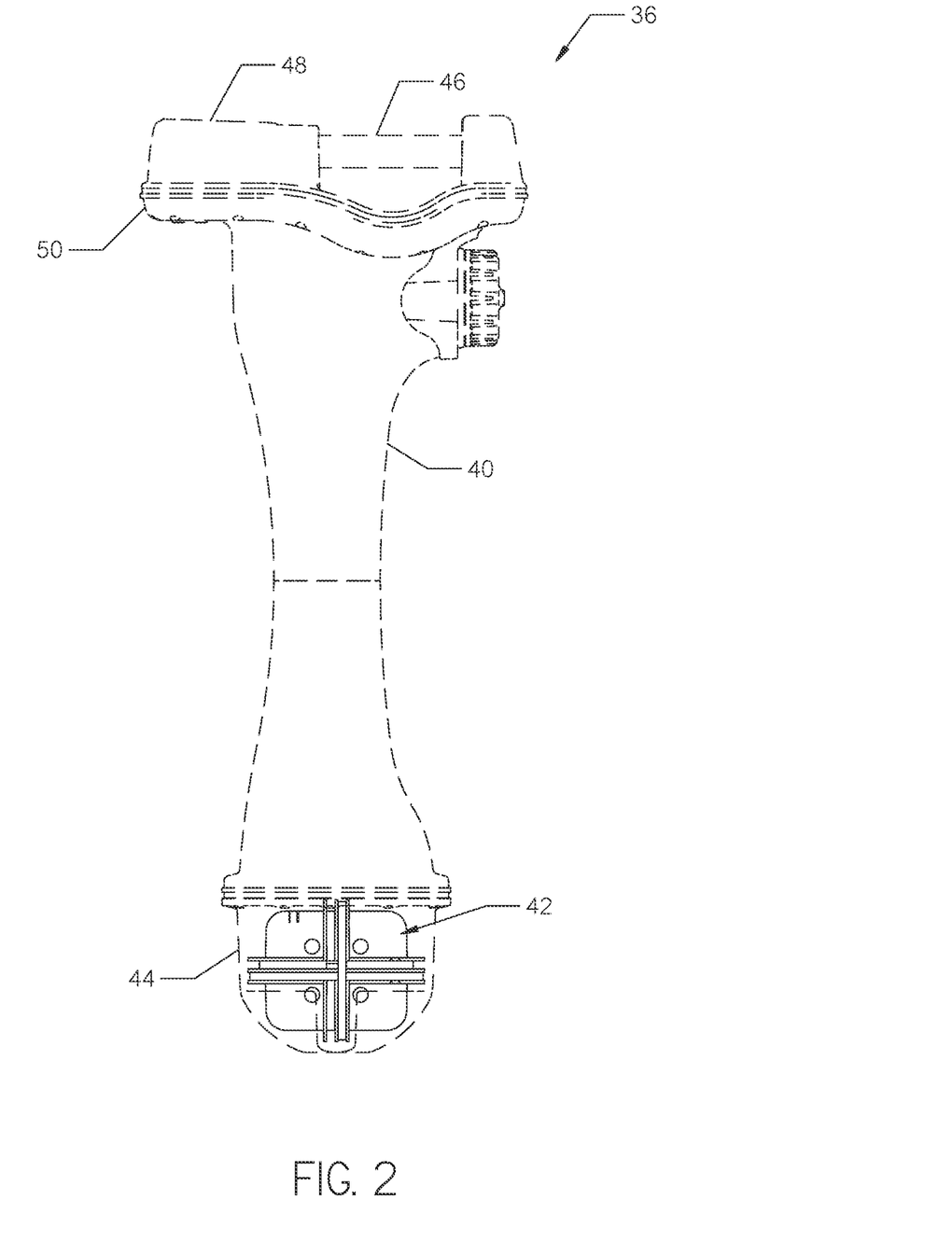
FIG. 2 is an illustration of a hand-held tracker. The tracker is shown in phantom such that an antenna assembly installed within the tracker is visible.

With reference to FIG. 2, one embodiment of the above-ground tracker 36 is shown. The tracker 36 comprises an elongate housing 40 having one or more antenna assemblies 42 disposed therein. The antenna assembly 42 is disposed at the lower end 44 of the housing 40, and a handle 46 and a display 48 are formed at the opposed upper end 50 of the housing 40. Trackers known in the art having other shapes and sizes may also be used in place of the tracker 36 shown in FIG. 2.

Continuing with FIG. 2, the tracker 36 further comprises one or more filters, one or more amplifiers, an A/D converter, and a processor. In operation, the antenna assembly 42 receives electromagnetic radiation and generates a set of signals or voltages representative of that radiation. The set of signals are sent to the filter and amplifier. The filter eliminates noise included in the set of signals by removing any signals that are not tuned to the same frequency as the beacon signal 34, and the amplifier increases the magnitude of the set of signals. From the filter and amplifier, the set of signals are sent to the A/D convertor. The A/D convertor converts the set of signals into digital data and sends the digital data to the processor.

The processor may comprise a digital signal processor (DSP) and a microcontroller. The processor decodes the digital data received from the A/D convertor and performs calculations to determine a location of the beacon 32 relative to the tracker 36. The processor also interprets information transmitted on the beacon signal 34 about the downhole conditions and beacon diagnostics, such as battery status, pitch, and roll. The results of the analyses performed by the processor may be shown on the display 48 for the operator 38.

Figure 3:
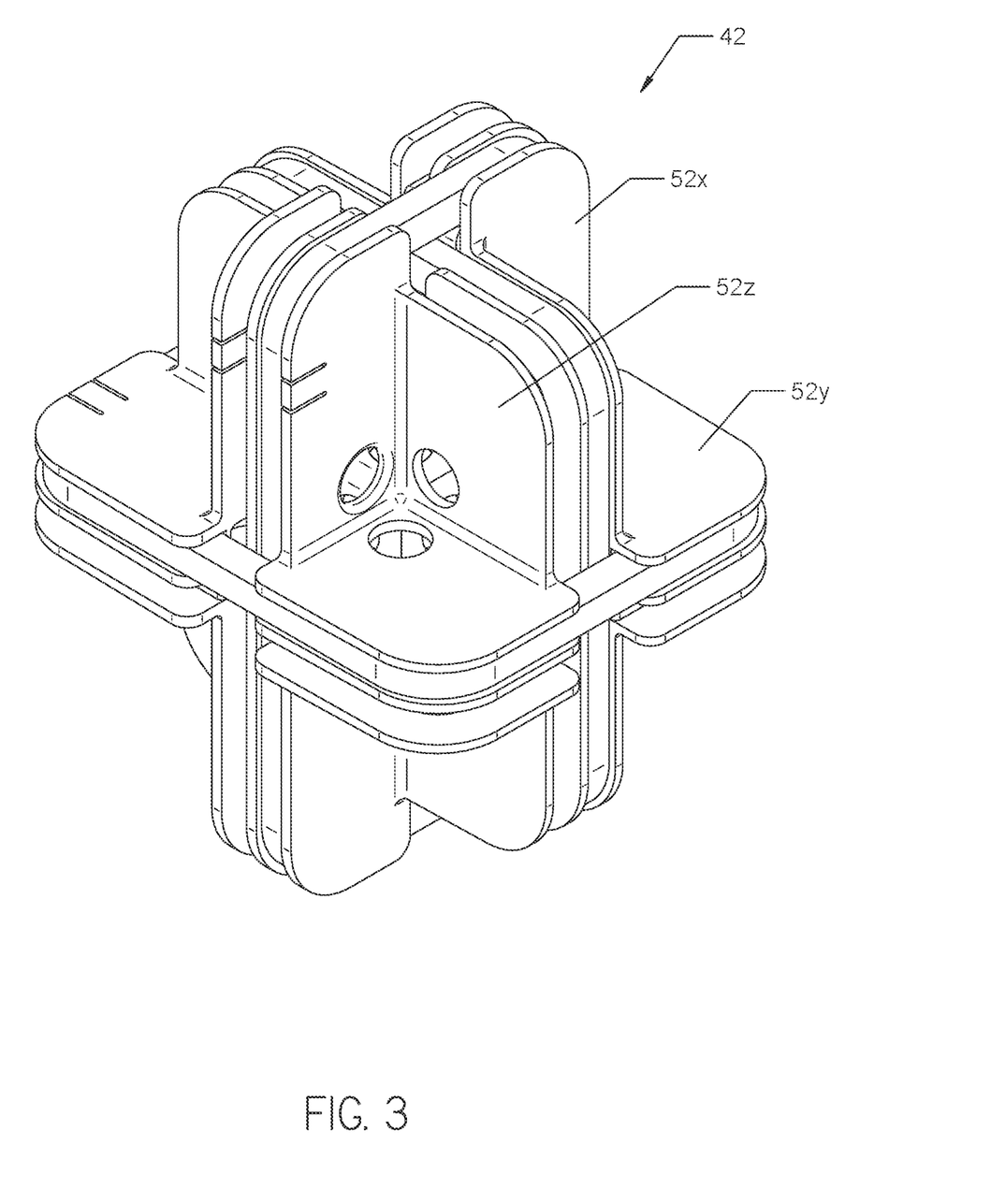
FIG. 3 a perspective view of the antenna assembly shown in FIG. 2.

With reference to FIG. 3, the antenna assembly 42 comprises a plurality of antennas 52. Three orthogonally positioned antennas 52 are included in the embodiment shown in FIG. 3. Each antenna 52 is positioned on a different axis (x, y, and z). That is, each of the three antennas 52 is disposed on a plane which sits at a ninety degree angle to each of the other two antennas 52. For clarity, each antenna 52 is labeled as antenna 52X, 52Y, and 52Z in FIGS. 3 and 8-11. Each antenna 52 detects the beacon signal 34 on a different axis. The "z" axis corresponds with the up-down direction of the beacon signal 34, and the "x" and "y" axes correspond to the right-left and forward-backward direction of the beacon signal 34. Other embodiments of the antenna assembly 42 are described in U.S. Pat. No. 9,239,297, authored by Cole et al., the contents of which are incorporated herein by reference.

Figure 4:
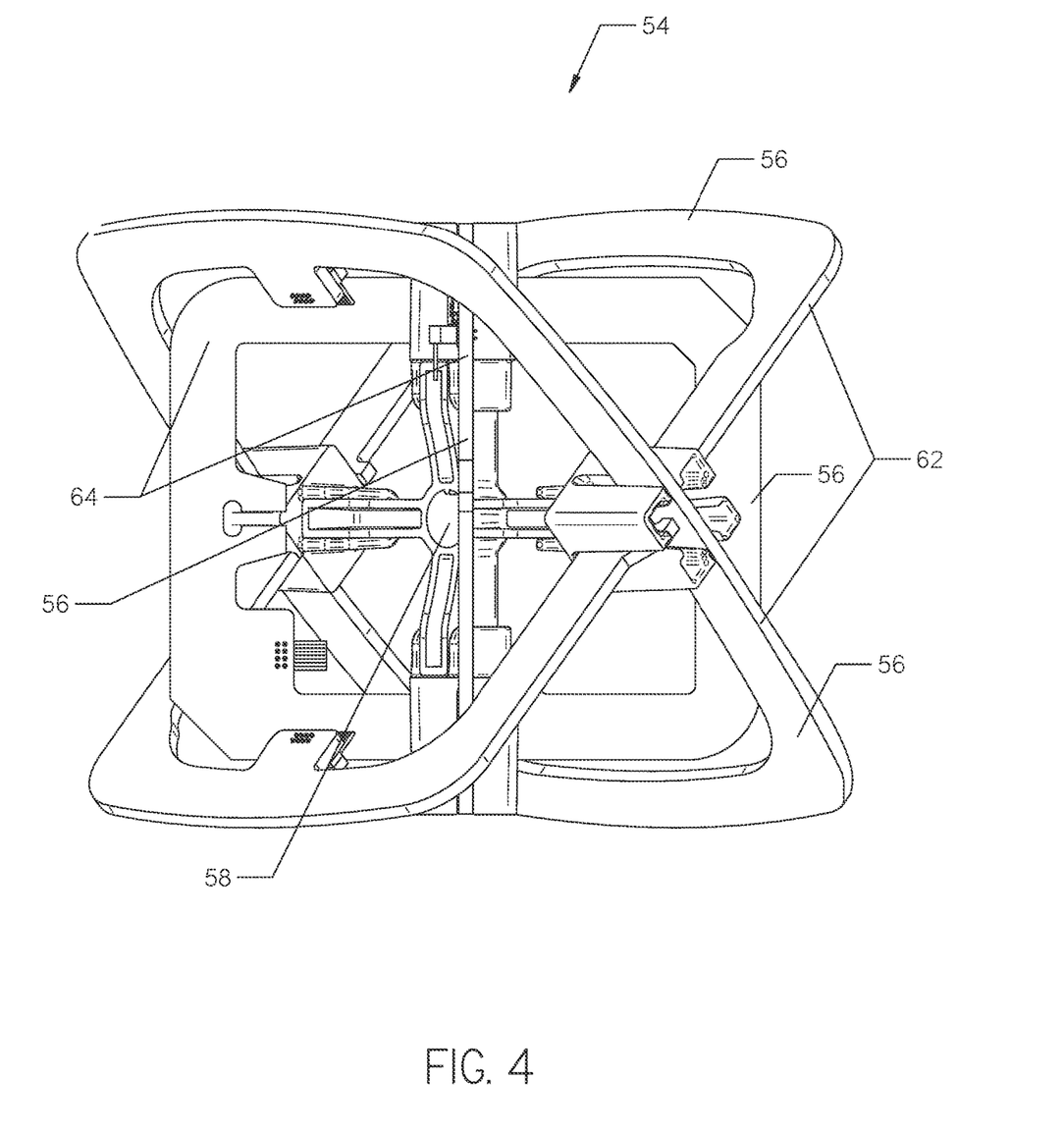
FIG. 4 is a perspective view of another embodiment of an antenna assembly.

With reference to FIG. 4, another embodiment of an antenna assembly 54 is shown. The antenna assembly 54 may be used in the tracker 36 in place of the antenna assembly 42 shown in FIG. 2. The antenna assembly 54 comprises a plurality of antennas 56 having a common center point 58. Four antennas 56 are included in the embodiment shown in FIG. 4. Each antenna 56 is oriented in a different direction and defines a different plane. The antennas 56 shown in FIG. 4 are each oriented at a 45 degree angle relative to a horizontal plane passing through the center point 58. The antennas 56 are grouped into a first pair 62 and a second pair 64.

Rather than detect the beacon signal 34 on three axes, like the antenna assembly 42, the antenna assembly 54 detects the beacon signal 34 by balancing the beacon signal 34 received by the antennas 56. The first pair 62 of antennas 56 detects the forward and backward direction of the beacon signal 34 along the borepath, and the second pair 64 of antennas 56 detects the side-to-side direction of the beacon signal 34. In operation, the operator 38 detects the beacon signal 34 by balancing the signal strength between the antennas 56 of each pair 62 and 64. Other embodiments of the antenna assembly 54 are described in U.S. Patent Publication No. 2020/0142089, authored by Cole et al., the contents of which are incorporated herein by reference.

Figure 5:
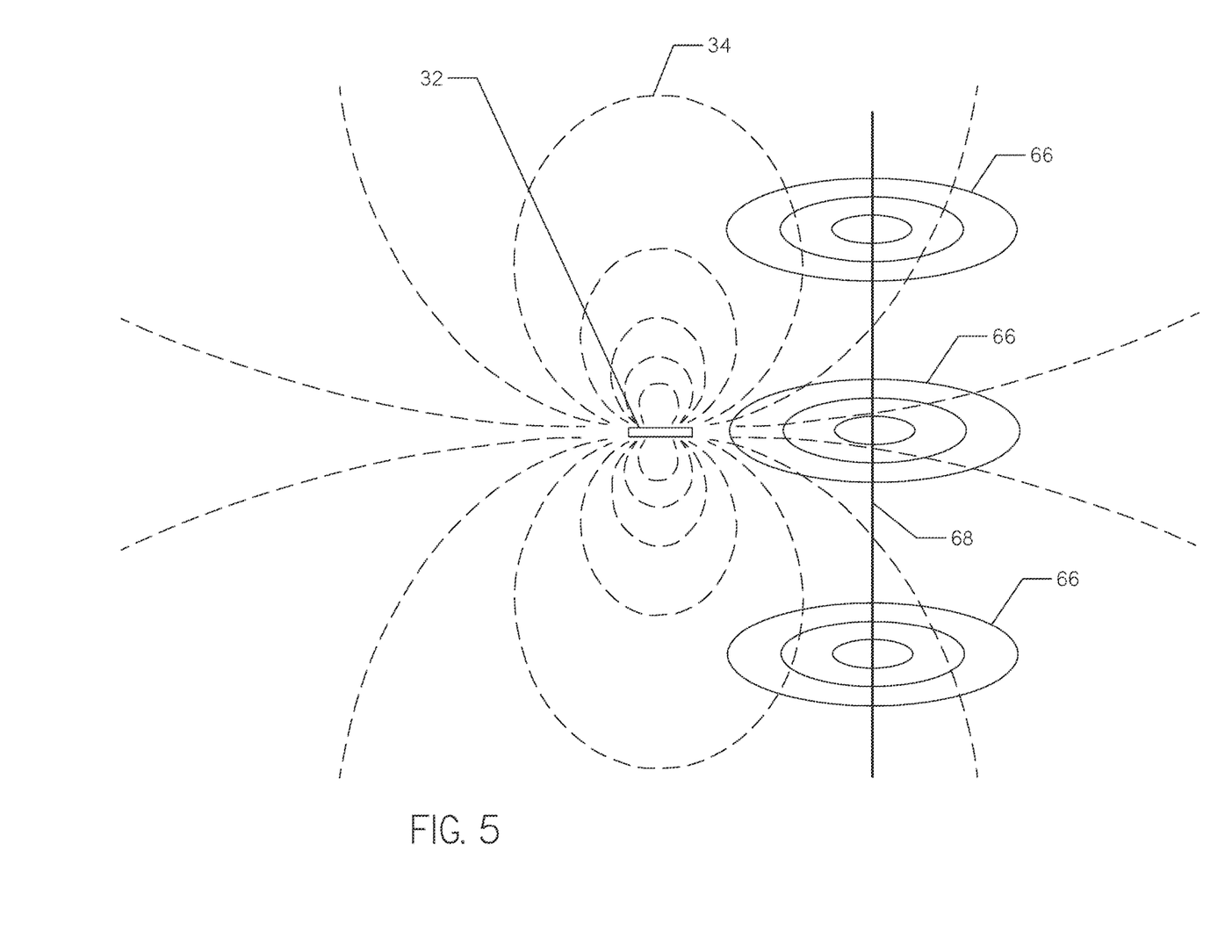
FIG. 5 is an illustration of a beacon signal radiating from an underground beacon adjacent a local noise source. Electromagnetic signals are shown radiating from the local noise source.

During operation, there may be instances where interference or noise from outside sources emitting signals interrupts the beacon signal 34, as shown by the noise signals 66 radiating from a noise source 68 in FIG. 5. The noise source may be an electric utility line, for example. One method of addressing this problem is to analyze the planned borepath for electromagnetic interference. Using such analysis, the operator may select a frequency at which to emit the beacon signal 34 with little or no interference. A borepath analyzer is provided in U.S. Pat. No. 9,971,013, issued to Cole et al., the contents of which are incorporated herein by reference.

Despite selecting a frequency determined to have little or no interference at which to emit the beacon signal 34, an ambient noise source transmitting at the same frequency as the beacon signal 34 may still be encountered while boring. Such noise source can be orders of magnitude higher than the beacon signal 34. Thus, it may be difficult or even impossible to detect the beacon signal 34 in the presence of such noise source, making it difficult to continue boring operations.

Figure 6:
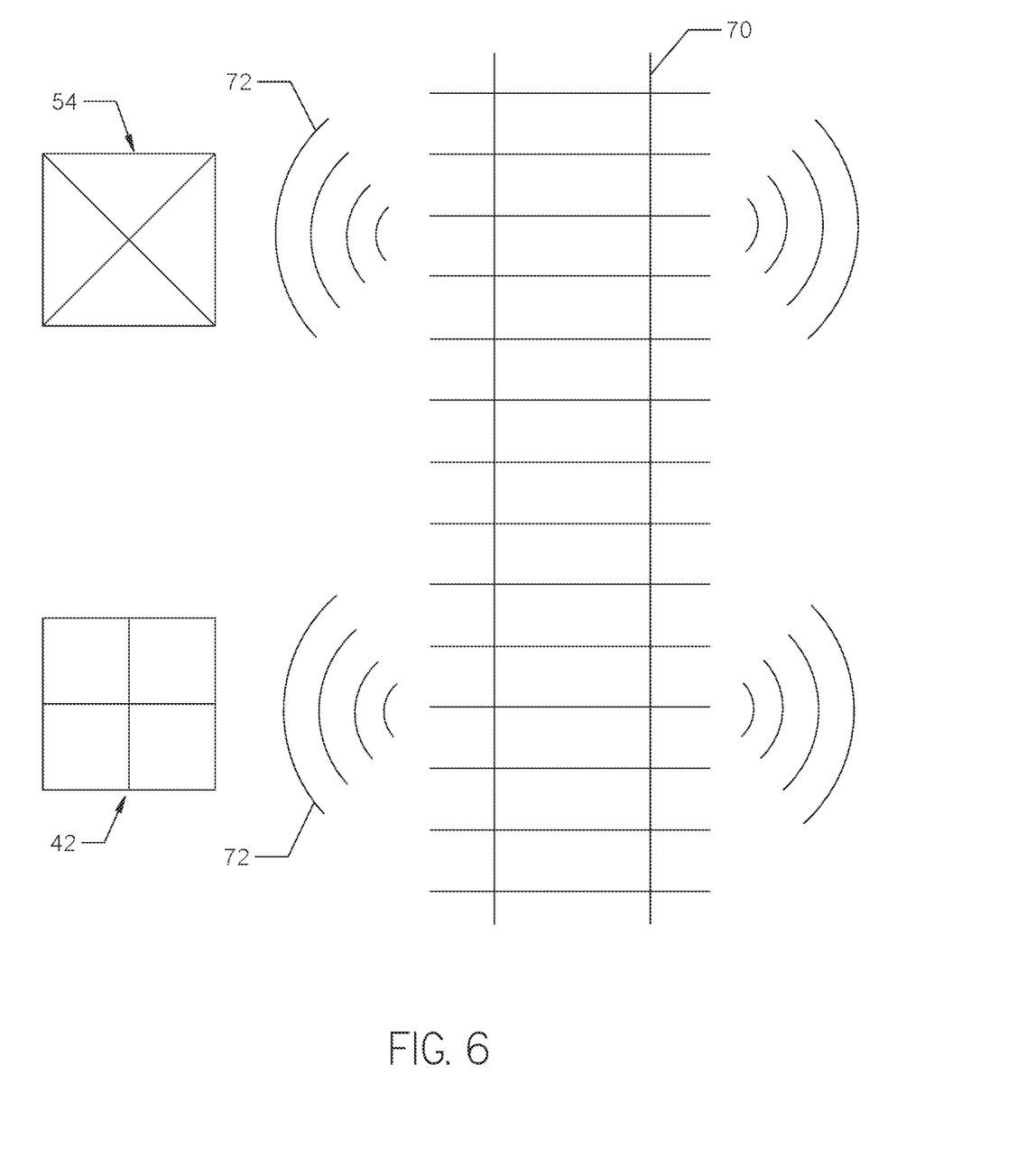
FIG. 6 is an illustration of the antenna assemblies shown in FIGS. 3 and 4 positioned adjacent a railroad track emitting electric signals.

The ambient noise source, however, is often directional in nature. Meaning, any electromagnetic radiation emitted from a noise source may only impinge one area of the antenna assembly 42 or 54. For example, a nearby railroad track 70 may emit electrical signals 72 out away from the sides of the track 70, as shown in FIG. 6. The electrical signals 72 may only impinge those areas of the antenna assembly 42 or 54 that face the railroad track 70. Such areas may receive maximum or peak noise ambient noise signals. In contrast, the non-facing areas of the antenna assembly 42 or 54 should have minimal to zero interference from the electrical signals 72. Therefore, the tracker 36 may be able to detect the beacon signal 34 using the signals generated by those areas of the antenna assembly 42 or 54 not receiving peak ambient noise.

Figure 7:
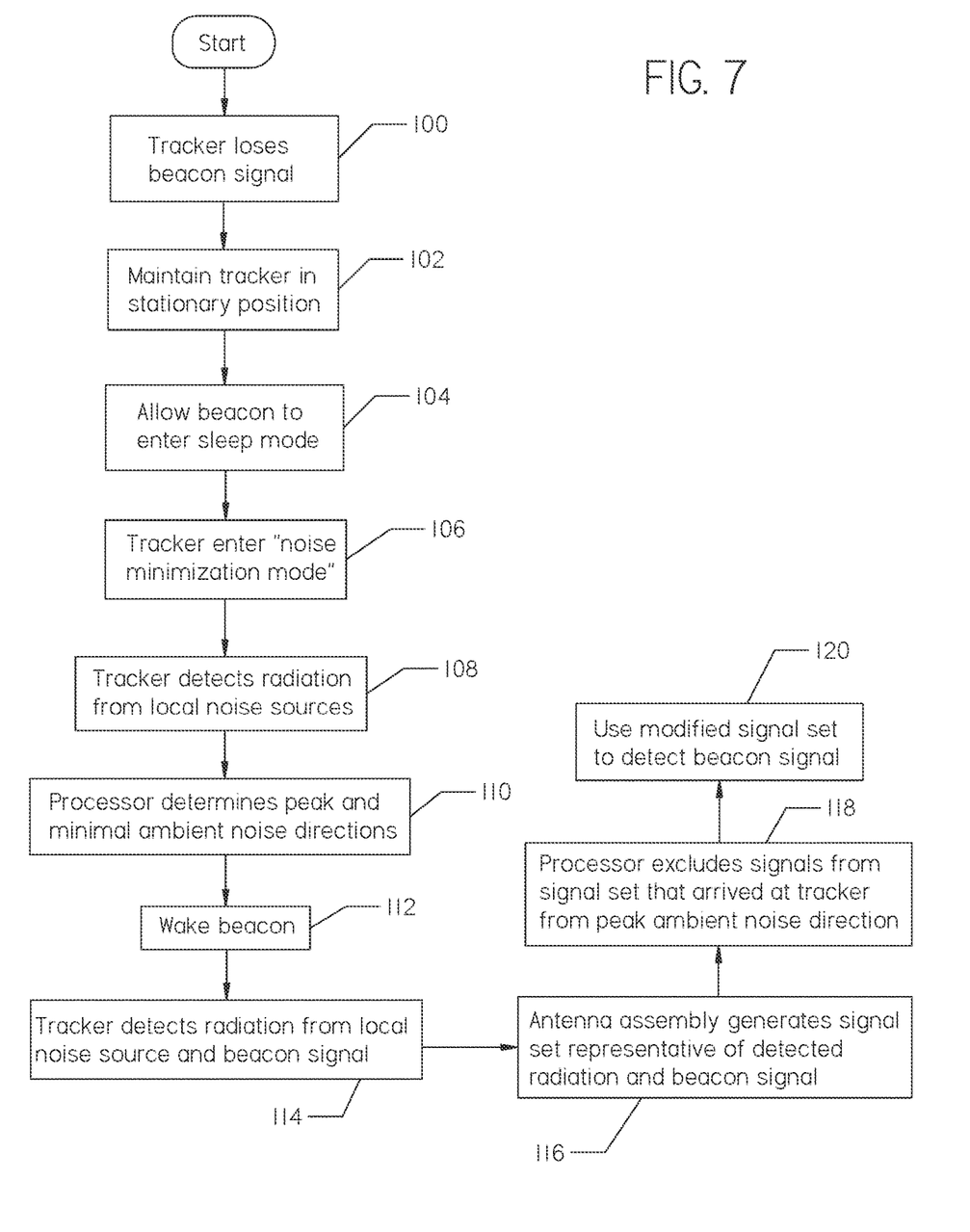
FIG. 7 is a flow chart of a method of detecting a beacon signal.

Turning to FIG. 7, one method of determining what areas of the antenna assembly 42 or 54 receive peak ambient noise and what areas receive minimal ambient noise is shown. To start, the operator 38 tracks the beacon signal 34 until ambient noise causes the tracker 36 to lose the beacon signal 34, as shown by step 100. Following loss of the beacon signal 34, the operator 38 maintains the tracker 36 in a stationary position where the beacon signal 34 was lost, as shown by step 102. The beacon 32 is then allowed to go to sleep, thereby discontinuing transmission of the beacon signal 34, as shown by step 104. Discontinuing transmission of the beacon signal 34 ensures that any radiation subsequently detected by the tracker 36 is from a local noise source. Once transmission of the beacon signal 34 is discontinued, the operator 38 directs the tracker 36 to enter a "noise minimization mode", as shown by step 106. Such mode may be entered upon human input on the tracker's display 48.

Continuing with FIG. 7, in the noise minimization mode, the tracker 36 detects radiation from local noise sources at the same frequency the beacon signal 34 was transmitted, as shown by step 108. Upon detecting ambient noise, the processor will determine a direction from which peak ambient noise arrives at the tracker 36, as shown by step 110. If more than one local noise source is near the tracker 36, the processor may determine one or more directions from which peak ambient noise arrives at the tracker 36. Such one or more directions may be referred to herein as the peak ambient noise direction. The processor will also determine one or more directions from which minimal ambient noise arrives at the tracker 36, as shown by step 110. Such one or more directions may be referred to herein as the minimal ambient noise direction.

The processor may determine the peak ambient noise direction by calculating an angle at which high magnitudes of radiation impinge the antenna assembly 42 or 54. Likewise, the processor may determine the minimal ambient noise direction by calculating an angle at which none or low magnitudes of radiation impinge the antenna assembly 42 or 54.

After the processor determines the peak and minimal noise direction, the beacon 32 may start or resume transmission of the beacon signal 34, as shown by step 112. The antenna assembly 42 or 54 subsequently receives electromagnetic radiation from both the beacon signal 34 and local noise sources, as shown by step 114. The antenna assembly 42 or 54 generates a set of signals indicative of the received radiation, as shown by step 116. The signal set is subsequently transmitted to the processor.

Continuing with FIG. 7, the processor is configured to exclude those signals included in the signal set that are representative of radiation that arrived at the tracker 36 from the peak ambient noise direction, as shown by step 118. By excluding such signals, the processor creates a modified signal set from the set of signals generated by the antenna assembly 42 or 54. The modified signal set is representative of radiation that arrived at the tracker 36 from the minimal ambient noise direction. The processor uses the modified signal set to detect the beacon signal 34, as shown by step 120.

Figure 8:
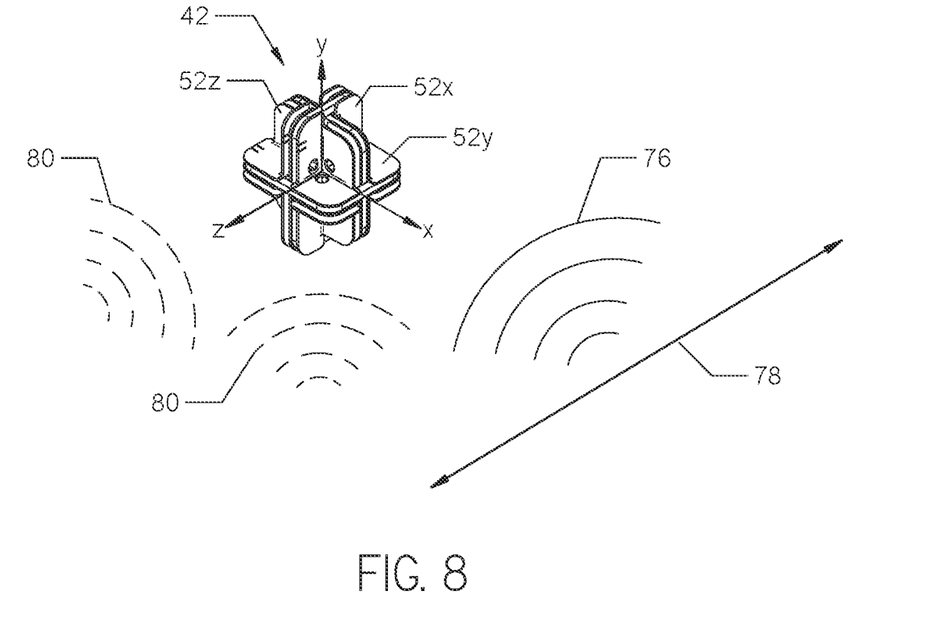
FIG. 8 is a perspective view of the antenna assembly shown in FIG. 3 receiving noise signals from an adjacent noise source.
Figure 9:
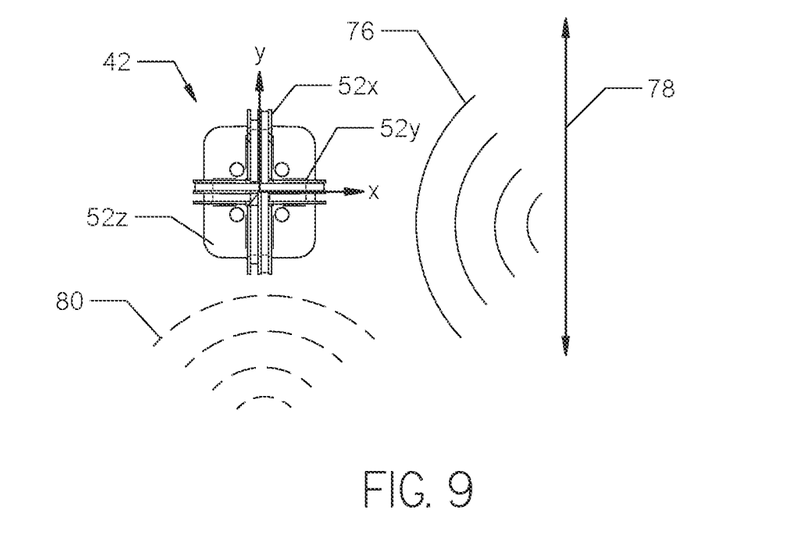
FIG. 9 is a plan view of the antenna assembly and noise source shown in FIG. 8.

Turning to FIGS. 8 and 9, in one embodiment, the processor may exclude signals from the signal set by blocking certain signals from being transmitted to the processor. For example, peak ambient noise signals 76 are shown radiating from a noise source 78 in FIGS. 8 and 9. The peak ambient noise signals 76 are shown primarily impinging the antenna 52 positioned on the x-axis or antenna 52X. Minimal ambient noise signals 8o are shown impinging the other antennas 52, positioned on the y and z-axes or antenna 52Y and 52Z. In such example, the processor may block all signals generated by the antenna 52 positioned on the x-axis or antenna 52X from being transmitted to the processor. Thus, the modified signal set may include only those signals generated by the antennas 52 positioned on the y and z-axes or antenna 52Y and 52Z.

Figure 10:
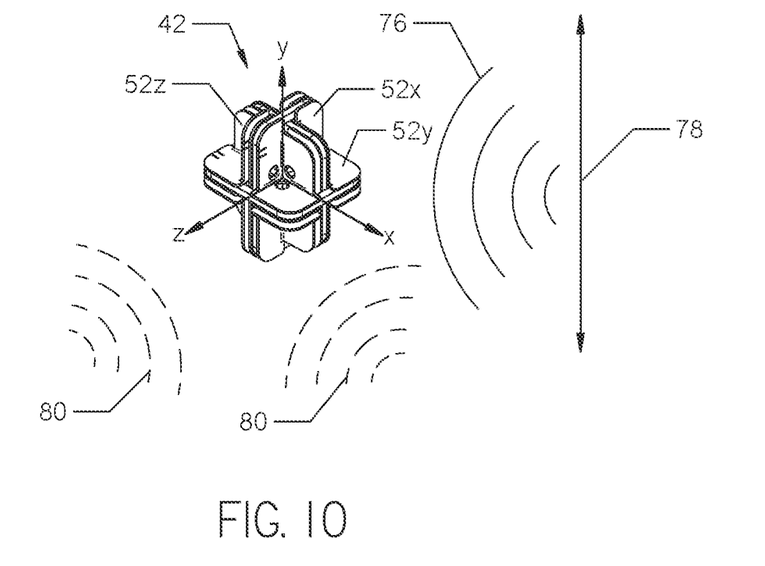
FIG. 10 is the perspective view of the antenna assembly and noise source shown in FIG. 8, but the antenna assembly has been slightly rotated.
Figure 11:
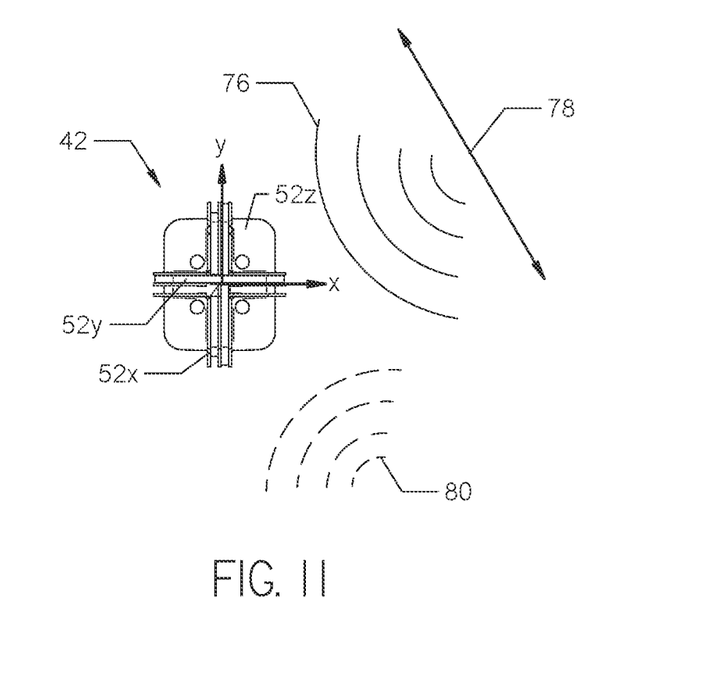
FIG. 11 is a plan view of the antenna assembly and noise source shown in FIG. 10.

Turning to FIGS. 10 and 11, in another embodiment, the processor may exclude signals from the signal set by removing certain signals transmitted to the processor from the signal set. In FIGS. 10 and 11, the antenna assembly 42 is rotated from its position shown in FIGS. 8 and 9, such that the peak ambient noise signals 76 are impinging antennas 52 positioned on both the y and the x-axes or antenna 52Y and 52X. None of the antennas 52 making up the antenna assembly 42 is directly aligned with the direction the peak ambient noise signals 76 are radiating from. Because the processor cannot easily determine which antennas 52 are receiving peak ambient noise, all signals generated by the antenna assembly 42 are transmitted to the processor. The processor then analyzes the received signals to determine which antenna or antennas 52 are receiving peak ambient noise.

The processor determines which antenna or antennas 52 are receiving peak ambient noise using a 3D rotation matrix calculation. Such calculation allows the processor to identify the angle at which the peak and minimal noise signals 76 and 80 are received by each antenna 52. Once the processor determines which antenna or antennas 52 are receiving peak ambient noise, the processor removes all signals from such antenna or antennas 52 from the set of signals, thereby creating the modified signal set. Thus, the processor only analyzes signals received by an antenna or antennas 52 identified by the processor as receiving minimal noise signals 80. Such method is preferably used with the antenna assembly 54, which will likely receive peak ambient noise on more than one antenna 56.

Following detection of the beacon signal 34 using the above method, the operator 38 may continue to track the beacon signal 34 along the borepath. The above method may be repeated, as needed, during operation.

Figure 12:
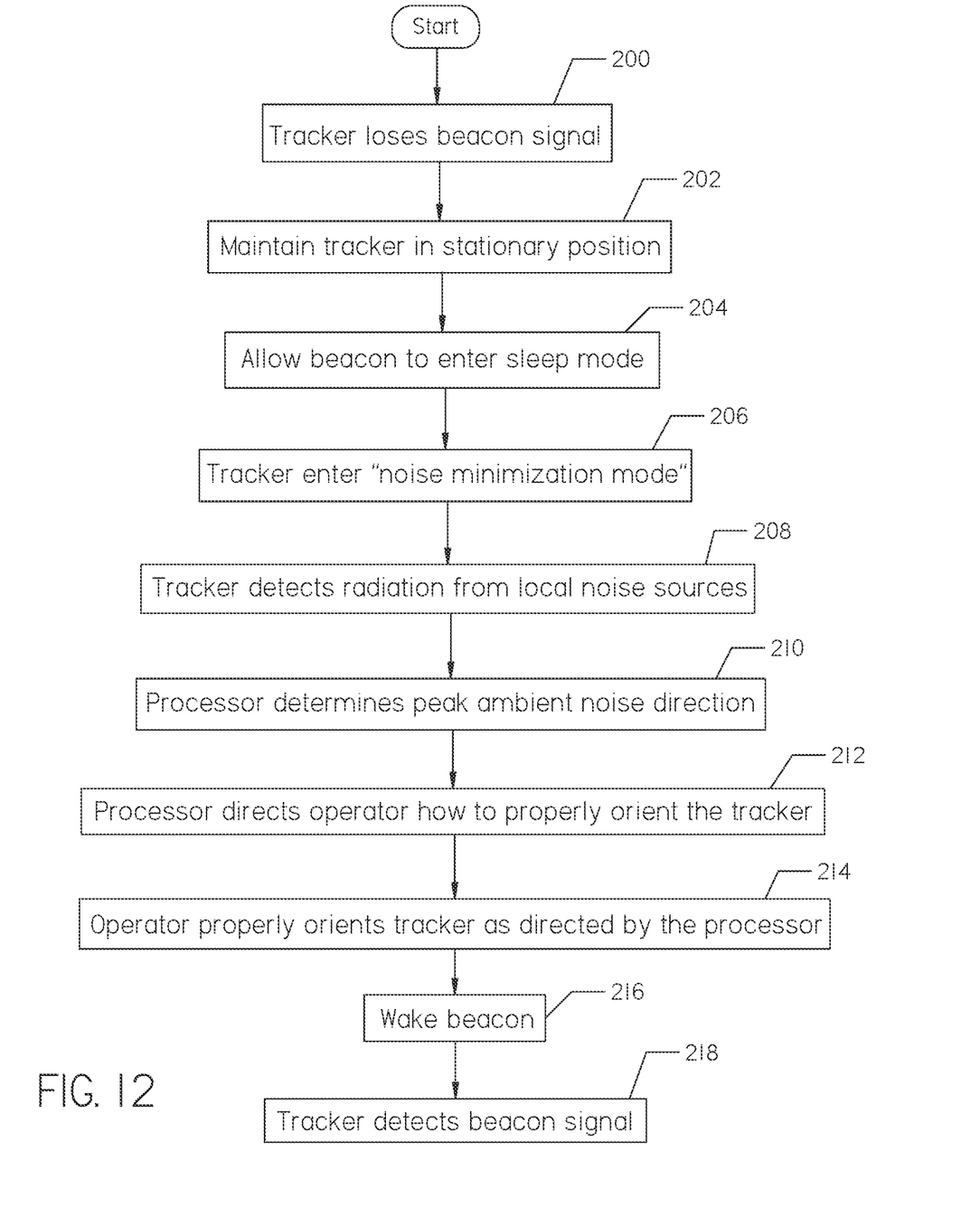
FIG. 12 is a flow chart of another method of detecting a beacon signal.

Turning to FIG. 12, another method of minimizing the noise interfering with the beacon signal 34 is shown. Instead of using math to create a modified signal set, like the methods described above, the method shown in FIG. 12 uses physical manipulation of the tracker 36 to minimize the amount of noise interfering with the beacon signal 34. For example, the tracker 36 may be rotated so that at least one antenna 52 of the antenna assembly 42 does not receive any or receives very little peak ambient noise. Such antenna 52 is then able to detect the beacon signal 34 with little to no interference. The underground location of the beacon 32 is then determined using the detected beacon signal 34 and previously known information about the beacon 32. Such information may include, for example, the last known locations of the beacon 32 and the known amount of pipe sections 28 that have been added to the drill string 14 since the last known location of the beacon 32.

Continuing with FIG. 12, like the method shown in FIG. 7, the method starts upon the tracker 36 losing the beacon signal 34, as shown by step 200. Once the beacon signal 34 is lost, the tracker 36 is maintained in a stationary position and the beacon 32 is allowed to enter sleep mode, as shown in steps 202 and 204. Following the tracker 36 being put into "noise minimization mode", the tracker 36 detects radiation from local noise sources, as shown in steps 206 and 208. The processor then determines a direction from which peak ambient noise is arriving at the tracker 36, as shown by step 210.

Following determination of such direction, the processor directs the operator 38 to rotate or pivot the tracker 36 until at least one of the antennas 52 making up the antenna assembly 42 is not positioned directly perpendicular to the direction from which peak ambient noise arrives at the tracker 36, as shown by step 212. This means that the axis on which the antenna 52 is situated does not extend directly perpendicular to such direction. Preferably, the processor directs the operator 38 to rotate the tracker 36 until at least one of the antennas 52 is positioned parallel to the direction from which peak ambient noise arrives at the tracker 36. Meaning, the axis on which the antenna 52 is situated extends parallel to such direction.

With reference to FIGS. 10 and 11, the tracker 36 may be rotated, for example, until the z-axis, or antenna 52Z, directly faces and extends parallel to the peak ambient noise signals 76. If possible, the tracker 36 is also oriented such that a second one of the antennas 52 is also not positioned on an axis that extends perpendicular to the direction.

Once the tracker 36 is reoriented as directed by the processor, the tracker 36 is considered properly positioned or properly oriented so that at least one of the antennas 52 receives little to no peak ambient noise, as shown by step 214. Thereafter, the beacon 32 is directed to resume emission of the beacon signal 34, as shown in step 216. The at least one antenna 52 not receiving peak ambient noise is then able to detect the beacon signal 34, as shown by step 218. The detected beacon signal 34 is then used to determine the location of the beacon 32.

Figure 13:
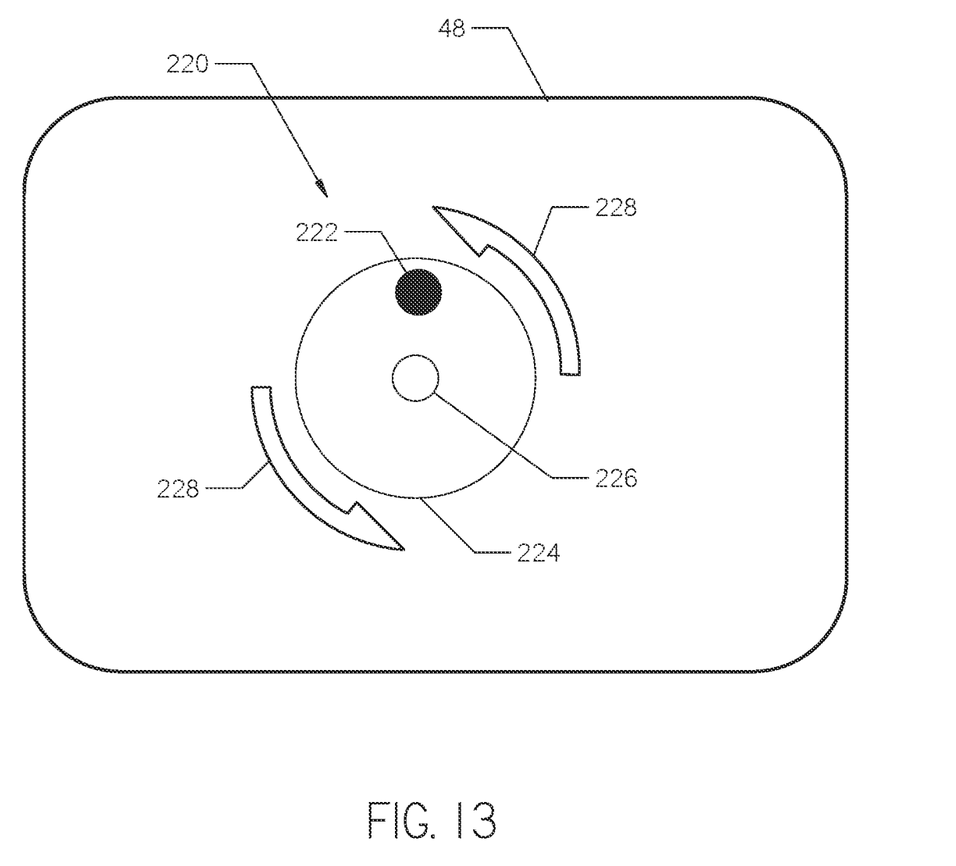
FIG. 13 is a plan view of a display used with the tracker shown in FIG. 2. A dynamic icon is shown in the display.

Turning to FIG. 13, the processor directs the operator 38 how to properly position or properly orient the tracker 36 by displaying directions on the display 48. One method of directing the operator 38 how to rotate the tracker 36 is by using a dynamic icon 220 shown the display 48, as shown, for example, in FIG. 13. The dynamic icon 220 comprises a ball 222 positioned within a circle 224 having a center target 226. The dynamic icon 220 further comprises arrows 228 positioned outside of the circle 224.

Continuing with FIG. 13, the arrows 228 direct the operator which direction to rotate the tracker 36, clockwise or counterclockwise. As the tracker 36 is rotated in the identified direction, the arrows 228 continually shrink in length as the tracker 36 reaches the desired orientation. The ball 222 directs the operator 38 how rotate or pivot the tracker 36 to a desired level. The operator 38 moves the tracker 36 until the ball 222 is positioned within the center target 226. Once the ball 222 is in the target 226 and the arrows 228 are removed from the display 48, or the arrows 228 are no longer pointing in a specific direction, the tracker 36 is considered properly oriented. When properly oriented, the at least one antenna 52 receives little to no peak ambient noise.

In alternative embodiments, different sizes, shapes, or orientations of dynamic icons may be used to direct the operator how to properly position the tracker 36. In further alternative embodiments, written directions may be shown on the display 48 for the operator instead of using a dynamic icon.

The method shown in FIG. 12 may also be used with the antenna assembly 54 shown in FIG. 4. The method is carried out in the same manner, but the operator now has four antennas 56 to work with instead of three. Like the antenna assembly 42, the processor directs the operator to rotate the tracker 36 until at least one of the antennas 56 is not positioned directly perpendicular to the direction from which peak ambient noise arrives at the tracker 36. This means that the axis on which the antenna 56 is situated does not extend directly perpendicular to such direction. Preferably, the processor directs the operator 38 to rotate the tracker 36 until at least one of the antennas 56 is positioned parallel to the direction from which peak ambient noise arrives at the tracker 36. Meaning, the axis on which the antenna 56 is situated extends parallel to such direction.

The tracker 36 may be equipped to perform any one or all of the methods described above. If the tracker 36 is configured to perform all of the methods, when the tracker 36 is put into "noise minimization mode", the operator 38 may be directed to select a desired method prior to the noise minimization mode commencing. In some embodiments, the tracker 36 may be configured to perform the method shown in FIG. 12 and the method shown in FIG. 7. For example, the processor may direct the operator to properly orient the tracker, and the processor may also exclude or block certain signals detected by the antenna assembly 42 or 54 to create a modified signal set.

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only, and changes may be made in detail. Changes may especially be made in matters of structure and arrangements of parts within the principles of the present technology to the full extent indicated by the broad general meaning of the terms in which the appended claims are expressed.

The invention claimed is:

1. A method of using an underground beacon that transmits a beacon signal, comprising:
   actuating an above-ground tracker that is adapted to receive the beacon signal, the above-ground tracker comprising a plurality of antennas, each antenna oriented in a different direction;
   if the beacon signal is active, discontinuing transmission of the beacon signal;
   thereafter, with the plurality of antennas, determining a direction from which peak ambient electromagnetic noise arrives at the above-ground tracker;
   thereafter, positioning the above-ground tracker such that at least one antenna of the plurality of antennas is oriented on an axis that does not extend perpendicular to the direction;
   thereafter, starting or resuming transmission of the beacon signal at the underground beacon; and
   thereafter, detecting the beacon signal using the at least one antenna.

2. The method of claim 1, in which positioning step comprises:
   positioning the above-ground tracker such that the axis on which the at least one antenna is oriented on extends parallel to the direction.

3. The method of claim 1, in which the plurality of antennas comprises:
   a first antenna situated on a first axis;
   a second antenna situated on a second axis; and
   a third antenna situated on a third axis;
   in which each axis is orthogonal to one another; and
   in which the at least one antenna is characterized as the first antenna and the axis is characterized as the first axis; and in which the positioning step comprises:
   positioning the above-ground tracker such that the first antenna is oriented such that the first axis does not extend perpendicular to the direction.

4. The method of claim 3, in which the positioning step further comprises:
   positioning the above-ground tracker such that the second antenna is oriented such that the second axis does not extend perpendicular to the direction.

5. The method of claim 1, in which the plurality of antennas has a common center point and each antenna is positioned on a different plane.

6. The method of claim 5, in which the axis aligns with the plane that the at least one antenna is positioned on.

7. The method of claim 1, further comprising the steps of:
   determining how the above-ground tracker should be positioned so that the at least one antenna is positioned on the axis that does not extend perpendicular to the direction; and
   directing an operator how to position the above-ground tracker so that the at least one antenna is positioned on the axis that does not extend perpendicular to the direction.

8. The method of claim 1, in which each antenna is orthogonal to each other antenna.

9. The method of claim 1, in which the step of determining a direction from which peak ambient electromagnetic noise arrives at the above-ground tracker comprises:
   calculating an angle at which the peak ambient electromagnetic noise impinges one or more of the plurality of antennas.

10. A method of using an underground beacon that transmits a beacon signal, comprising:
    actuating an above-ground tracker that is adapted to receive the beacon signal, the above-ground tracker comprising a plurality of antennas, each antenna oriented in a different direction;
    if the beacon signal is active, discontinuing transmission of the beacon signal;
    thereafter, determining, with the plurality of antennas, a direction from which peak ambient electromagnetic noise arrives at the above-ground tracker;
    thereafter, positioning the above-ground tracker such that at least one antenna of the plurality of antennas is positioned on an axis that extends parallel to the direction;

thereafter, starting or resuming transmission of the beacon signal from the underground beacon; and thereafter, detecting the beacon signal using the at least one antenna.

11. The method of claim 10, in which the plurality of antennas comprises:
    a first antenna situated on a first axis;
    a second antenna situated on a second axis; and
    a third antenna situated on a third axis;
    in which each axis is orthogonal to one another; and
    in which the at least one antenna is characterized as the first antenna and the axis is characterized as the first axis; and in which the positioning step comprises:
        positioning the above-ground tracker such that the first antenna is oriented such that the first axis extends parallel to the direction.

12. The method of claim 11, in which the positioning step further comprises:
    positioning the above-ground tracker such that the second antenna is oriented such that the second axis does not extend perpendicular to the direction.

13. The method of claim 10, in which the plurality of antennas has a common center point and each antenna is positioned on a different plane.

14. The method of claim 13, in which the axis aligns with the plane that the at least one antenna is positioned on.

15. The method of claim 10, further comprising the steps of:
    determining how the above-ground tracker should be positioned so that the at least one antenna is positioned on the axis that extends parallel to the direction; and
    directing an operator how to position the above-ground tracker so that the at least one antenna is positioned on the axis that extends parallel to the direction.

16. The method of claim 10, in which each antenna is orthogonal to each other antenna.

17. The method of claim 10, in which the step of determining a direction from which peak ambient electromagnetic noise arrives at the above-ground tracker comprises:
    calculating an angle at which the peak ambient electromagnetic noise impinges one or more of the plurality of antennas.

18. A system, comprising:
    an underground beacon, operable in a first mode and a second mode, the underground beacon comprising a transmitting antenna, in which the first mode is defined by the transmitting antenna emitting an electromagnetic beacon signal, and the second mode is defined by the transmitting antenna emitting no electromagnetic signal; and
    an above ground tracker, comprising:
        a plurality of antennas, each antenna oriented in a different direction and configured to receive electromagnetic radiation and generate a set of signals indicative of the received electromagnetic radiation; and
        a processor, the processor configured to perform a set of steps comprising:
            determining if the underground beacon is in the first mode;
            if the underground beacon is in the first mode, directing the underground beacon to enter the second mode;
            when the underground beacon is in the second mode, receiving the set of signals from the plurality of antennas;
            from the set of signals, determining a peak direction of an ambient electromagnetic noise;
            thereafter, providing a positioning instruction such that a selected one of the plurality of antennas is oriented parallel to the peak direction;
            thereafter, directing the underground beacon to enter the first mode; and
            using a selected signal received from the one of the set of signals associated with the selected one of the plurality of antennas to determine a position of the underground beacon relative to the above ground tracker.

19. The system of claim 18, in which the processor comprises a display configured to display a moving icon configured to direct the operator how to position the above-ground tracker in the determined orientation.

20. The system of claim 18, in which each antenna is orthogonal to each other antenna.

* * * * *